United States Patent
Rosenkranz et al.

[11] 3,860,598
[45] Jan. 14, 1975

[54] PROCESS FOR THE PRODUCTION OF BENZYLIDENE COMPOUNDS

[75] Inventors: Hans Jurgen Rosenkranz; Burkhard Lachmann, both of Krefeld; Hans Rudolph, Krefeld-Bockum, all of Germany

[73] Assignee: Bayer Aktiengesellschaft, Leverkusen, Germany

[22] Filed: Nov. 7, 1972

[21] Appl. No.: 304,527

[30] Foreign Application Priority Data
Nov. 9, 1971 Germany............................ 2155495

[52] U.S. Cl.... 260/287 R, 260/295 R, 260/332.2 A, 260/326.46, 260/471 R, 260/475 SC, 260/473 R
[51] Int. Cl............................................. C07d 33/48
[58] Field of Search...... 260/471 R, 475 SC, 287 R, 260/295 R, 326.46, 332.2 A

[56] References Cited
UNITED STATES PATENTS
3,390,051  6/1968  Baker et al...................... 260/471 R

*Primary Examiner*—Lorraine A. Weinberger
*Assistant Examiner*—L. A. Thaxton
*Attorney, Agent, or Firm*—Connolly and Hutz

[57] ABSTRACT

Object of the invention is a process for the production of compounds having the general formula

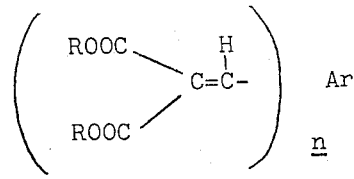

in which malonic acid esters are heated with benzene substituted by dihalogenmethylene groups in the presence of transition-metal salts and water with or without solvents. The compounds of the general formula can be used as UV absorbers.

10 Claims, No Drawings

PROCESS FOR THE PRODUCTION OF BENZYLIDENE COMPOUNDS

This invention relates to a process for the production of benzylidene compounds from malonic acid esters and benzal halides.

It is known that benzylidene compounds of the general formula:

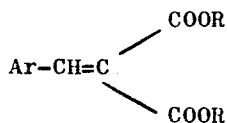

can be obtained from malonic acid esters and aromatic aldehydes. A suitable process is described, for example, in Org. Synth. 25, 42 (1945). In this process, benzaldehyde is condensed with malonic acid ethyl ester in the presence of piperidine, the reaction being accompanied by the elimination of water.

In another process for the production of such benzylidene compounds, malonic acid esters are converted into their sodium salt by treatment with a sodium alcoholate and the sodium salt is reacted with a benzal chloride. The use of benzal chlorides is an advantage of this process because these are frequently used as starting materials in the production of aromatic aldehydes. Nevertheless, the first-mentioned process would appear to be superior to this second process in which metallic sodium is used and anhydrous conditions have to be maintained.

In the process described in Org. Synth. Coll. Vol IV, page 285 (1963) metallic magnesium is used for the production of the malonate anions. The reaction of benzal halides with ions produced in this way does not show any advantages over the base-catalysed condensation of malonic esters with aromatic aldehydes.

The object of the invention is to provide a process for producing such benzylidene compounds which enables readily accessible benzal chlorides to be used without any of the disadvantages referred to above.

The invention thus relates to a process for the production of compounds of the general formula (I):

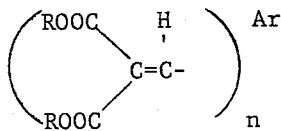

in which:

R represents a linear or branched-chain alkyl radical with from 1 to 20 carbon atoms or an aryl radical;

Ar represents an optionally substituted mononuclear or polynuclear aromatic or heteroaromatic radical; and $n$ is a number from 1 to 4, preferably 1 to 2, in which process compounds of the general formula (2):

$$Ar-(CHX_2)_n \quad (2)$$

in which:

Ar represents an optionally substituted mononuclear or polynuclear aromatic or heterocyclic radical;

X represents a halogen atom, preferably chlorine or bromine and $n$ is a number from 1 to 4, preferably 1 or 2, are heated at temperatures of from 40° to 200°C. with from 1 to 10 times the molar quantity of malonic acid esters in the presence of from 0.001 to 10% by weight, preferably from 0.05 to 3% by weight of transition-metal salts, and optionally, in the presence of 0.001 to 5% by weight of water based on the malonic acid ester used, with or, preferably, without solvents.

Compounds of the general formula (2) which can be condensed with malonic acid esters in accordance with the process claimed include mononuclear or polynuclear aromatic or heteroaromatic compounds which, in addition to from 1 to 4 —$CHX_2$-groups, preferably 1 to 2 —$CHX_2$-groups, can also be substituted one or more times by linear or branched-chain alkyl groups containing from 1 to 20 carbon atoms; mononuclear or polynuclear aryl groups or aralkyl groups, such as phenyl, naphthyl groups or benzyl groups which, optionally, may also contain one or more substituents in addition to further $CHX_2$-groups; O-alkyl or S-alkyl groups with from 1 to 20 carbon atoms; O-aryl or S-aryl groups, the aryl being preferably phenyl and being optionally substituted by $CHX_2$-groups, nitro groups, ester groups containing linear or branched chain alkyl groups with from 1 to 20 carbon atoms or optionally substituted phenols in the alcohol component; C—O-Alkyl group with from 1 to 20 carbon atoms and CO-aryl groups, the aryl being preferably phenyl and being optionally substituted by further $CHX_2$-groups.

Preferred mononuclear or polynuclear aromatic or heteroaromatic compounds include benzene, naphthalene, anthracene and their derivatives substituted as described above, and also, for example, pyridine, thiophene, pyrrole and quinoline.

The following are mentioned as examples of linear of branched alkyl groups with from 1 to 20 carbon atoms: methyl, ethyl, butyl, octyl, decyl and octadecyl groups.

The following compounds, for example, are suitable for reaction in the process claimed: benzal chloride, benzal bromide, p-chlorobenzal chloride, p-nitro benzal chloride, p-nitro benzal bromide, p-benzoyl benzal chloride, p-benzoyl benzal bromide, 4,4'-bis-dichloromethyl benzophenone, 2,6-dichlorobenzal chloride, p-methoxy benzal chloride, p-methyl benzal chloride, p-methyl benzal bromide, p-phenoxy benzal chloride, 4,4'-bis-dichloromethyl diphenyl ether, 4,4'-bis-dichloromethyl diphenyl methane, 1-dichloromethyl naphthalene, 2-dichloromethyl naphthalene, p-xylylene tetrachloride, 9-dichloromethyl anthracene, 4-dichloromethyl pyridine and 2-dichloromethyl thiophene.

In accordance with the claimed process, these substances are mixed with malonic acid esters containing hydrocarbon radicals having from 1 to 20 carbon atoms in the alcohol component, such as malonic acid methyl, ethyl, butyl, octyl, decyl, octadecyl, or phenyl esters, preferably in a molar ratio of malonic esters to benzal halide group of the compound of the general formula (II) from 1:1 to 1:2. However, this ratio is by no means specific and the claimed process can also be carried out with different ratios, more particularly with an excess of malonic ester.

In certain cases, it can be advantageous to carry out the reaction in the presence of a solvent, for example an aromatic or aliphatic hydrocarbon, such as toluene, xylene or a petroleum ether fraction preferably with a boiling range above 100°C; halogenated hydrocarbons such as chlorobenzene; or esters such as ethyl acetate preferably with a boiling point above 100°C. and thus enable the reaction temperature to be reached by virtue of their boiling point. However, the reaction is preferably carried out in the absence of solvents.

One factor of crucial importance in the application of the process according to the invention is the addition of from 0.001 to 10% by weight, preferably from 0.05 to 3% by weight, based on the malonic ester used, of transition metal salts, preferably in combination with small quantities of water which may either be present in the transition metal salts in the form of water of crystallization and/or which can be added to the reaction mixture in quantities of from 0.001 to 5% by weight, based on the malonic ester used. In the context of the invention, transition metal salts are salts of the transition elements as defined, for example, in Holleman-Wiberg, Lehrbuch der anorg. Chemie, Verlage W. de Gruyter and Co., Berlin 1971, Edition 71 – 80, pages 672 et seq. The following salts are preferably used: Fe(III)-, Cu(II)-, Co(II)-, Cr(III)-chlorides, acetates, sulphates and nitrates.

If the mixture containing the components described above is heated in the process, an evolution of HCl indicated the progress of the reaction at temperatures of from 40° to 200°C., depending upon the type of components which are being used and also depending upon their purity. As a rule, complete reaction of the components is obtained after a few hours at temperatures of from 80° to 150°C. In some cases, it can be advisable to control the velocity of the reaction by the addition of one of the components. Such procedure is also within the scope of the process claimed.

In many cases, the benzylidene compound can be worked up by direct distillation of the reaction mixture. Where the compounds have sufficiently high melting points, the reaction mixture frequently solidifies after cooling and the vinylidene compound can be obtained in pure form by recrystallization. Solvents suitable for this purpose can readily be found as reagent glass tests. Alcohols and aromatic and aliphatic hydrocarbons for example can be used for this purpose.

The benzylidene compounds produced by the process of the present invention are usefull as UV absorbers for stabilizing various polymeric plastic compositions such as polyvinylchloride, polystyrene, polyesters, polyolefins and polycarbonates in accordance with the same procedure described in GB 1 037 169. The benzylidene compounds may be incorporated in an amount of 0.05 to 2% by weight based on the polymeric material.

EXAMPLE 1

Benzylidene malonic acid diethyl ester 322 g of benzal chloride 350 g of malonic acid ethyl ester and 1 g of FeCl$_3$.6 H$_2$O are mixed in a 1 litre spherical flask and heated in an oil bath. There is a vigorous evolution of HCl at a temperature of from 80° to 100°C., ceasing after some 120 minutes at 125°C. The reaction mixture is initially freed from dissolved HCl under reduced pressure and subsequently distilled at 15 mmHg (water jet vacuum). 428 g (86%) of benzylidene malonic ester distill over at 186°C. in the form of a colourless oil.

| | | | |
|---|---|---|---|
| C$_{14}$H$_{16}$O$_4$ (248.28) | Calculated: | C, 67.6% | H, 6.50%. |
| | Found: | C, 67.9% | H, 6.74%. |

EXAMPLE 2 p-benzoyl benzylidene malonic ester 133 g of p-benzoyl benzal chloride, 88 g of malonic ester and 1 g of FeCl$_3$.6 H$_2$O are mixed in a 500 ml spherical flask and heated in an oil bath to 130°C. The evolution of HCl has ceased after 4 hours at this temperature and the reaction mixture is allowed to cool. Fine crystals precipitate and are filtered off under suction (6 g) and discarded. The mother liquor is distilled in a high vacuum, distilling over at 190°–206°/0.6 mmHg. The distillate crystallises on triturating with methanol. Following filtration under suction, colourless crystals melting at 57° to 59°C. are obtained in a yield of 97 g (55%).

| | | | |
|---|---|---|---|
| C$_{21}$H$_{20}$O$_5$: | Calculated: | C, 71.6%; | H, 5.70%. |
| | Found: | C, 71.4%; | H, 5.61%. |

EXAMPLE 3 p-nitrobenzylidene malonic ester 7 g of p-nitrobenzal chloride and 8 g of malonic acid ethyl ester are heated for 6 hours to 140°C. with 100 mg of FeCl$_3$.6 H$_2$O in a 50 ml spherical flask. After this period the evolution of HCl is over and the mixture is allowed to cool. The crystallised residue is filtered off under suction and recrystallised from ethanol with the aid of a little active carbon. Colourless crystals melting at 89°C. are obtained in a yield of 5.8 g (58% of the theoretical).

| | | | | |
|---|---|---|---|---|
| C$_{14}$H$_{15}$NO$_6$ (293.28) | Calculated: | C, 57.3%; | H, 5.15% | N, 4.78% |
| | Found: | C, 57.5%; | H, 5.31% | N, 5.04% |

EXAMPLE 4 p-phenylene-bis-(methylene-malonic acid diethyl ester)

5 g of p-dichloromethyl benzal chloride, 10 g of malonic acid diethyl ester and 80 mg of FeCl$_3$.6 H$_2$O are mixed and heated for 90 minutes to 120°C. After cooling, the solidified contents of the flask are digested in 15 ml of ethanol and, finally, the crystals are filtered off under suction. Almost colourless p-phenylene-bis-(methylene malonic acid diethyl ester) melting at 128° – 133°C., is obtained in a yield of 6.3 g (75% of the theoretical).

| | | | | |
|---|---|---|---|---|
| C$_{22}$H$_{28}$O$_8$ | Calculated: | C 63.15% | H 6.26% | O 30.59% |
| | Found: | 63.30% | 6.11% | 30.60% |

EXAMPLE 5 benzylidene malonic acid dimethyl ester 80.5 g of benzal chloride, 72 g of malonic acid dimethyl ester and 0.5 g of FeCl$_3$.6H$_2$O are reacted as in Example 1. The product distills at 180°C/15 mm Hg in the form of a colourless oil. Yield 79 g (71% of the theoretical).

| $C_{12}H_{12}O_4$ | Calculated: | C 65.4% | H 5.45% |
| | Found: | 65.5% | 5.44% |

EXAMPLE 6 benzylidene malonic acid-di-n-octyl ester 80.5 g of benzal chloride, 180 g of malonic acid-di-n-octyl ester and 0.5 g of $FeCl_3.6H_2O$, are reacted as in Example 1. The product distills at 240°C/1.5 mm Hg in the form of a colourless oil. Yield 185 g (89% of the theoretical).

| $C_{26}H_{40}O_4$ | Calculated: | C 75% | H 9.68% |
| | Found: | 75.1% | 9.75% |

EXAMPLES 7 to 11

The use of different catalysts in the production of benzylidenemalonic acid diethyl ester.

65 g of benzal chloride and 150 g of malonic acid diethyl ester are mixed. 400 mg batches of different catalyst salts together with 0.05 ml of water are added to 40 g samples of this mixture. The samples are heated to 120°C, causing an evolution of HCl. The end of the reaction is determined by gas chromatography. Constant benzylidene malonic acid ethyl ester contents (at least 75%) are detected after the following periods:

| Cr(III)-chloride | 10 hours |
| Co(II)-chloride | 4 hours |
| Ni(II)-chloride | 20 hours |
| Cu(II)-chloride | 8 hours |
| Fe(III)-chloride | 2 hours |

In the absence of the catalysts, there is no evolution of HCl, nor is it possible to detect any benzylidene malonic acid esters by gas chromatography, even after as long as 48 hours.

What we claim is:

1. A process for producing a compound of the formula

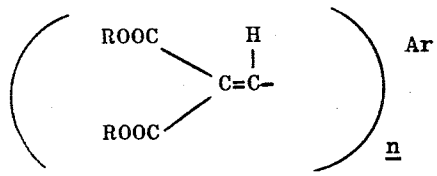

wherein R is linear or branched chain alkyl having from 1 to 20 carbon atoms or aryl, Ar is an optionally substituted mononuclear or polynuclear aromatic radical or a heteroaromatic radical of a member selected from the group consisting of pyridine, thiophene, pyrrole and quinoline and $n$ is an integer of from 1 to 4, said process comprising reacting 1 mol of a compound of the formula

wherein Ar and $n$ are as aforesaid and X is halogen with from 1 to 10 mols of a malonic acid ester at a temperature of from 40° to 200°C. and in the presence of from 0.001 to 10% by weight, based on the malonic acid ester, of a salt of a metal selected from the group consisting of iron, copper, cobalt and chromium.

2. The process as claimed in claim 1 in which the reaction is carried out in the presence of from 0.001 to 5% by weight of water, based on the malonic acid ester.

3. The process as claimed in claim 1 in which the reaction is carried out in the presence of an organic solvent.

4. The process as claimed in claim 1 in which the reaction is carried out in the absence of an organic solvent.

5. The process as claimed in claim 1 in which $n$ represents 1 or 2.

6. The process as claimed in claim 1, in which X represents a chlorine or bromine atom.

7. The process as claimed in claim 1, in which the reaction is carried out in the presence of from 0.05 to 3% by weight of the transition metal salt, based on the malonic ester.

8. The process as claimed in claim 1 in which the transition metal salt is an Fe(III)-, Cu(II)-, Co(II)- or Cr(III)-chloride, acetate, sulphate or nitrate.

9. The process as claimed in claim 1 in which the molar ratio of the malonic acid ester to the benzal halide group of said $Ar—(CH_2)_n$ compound is from 1:1 to 1:2.

10. The process as claimed in claim 1 in which the reaction is carried out at a temperature of from 80° to 150°C.

* * * * *